United States Patent [19]

Ono et al.

[11] Patent Number: 4,507,711
[45] Date of Patent: Mar. 26, 1985

[54] WIPER-MOUNTED RETRACTABLE HEAD LAMP ASSEMBLY

[75] Inventors: Eiichi Ono, Zama; Akio Aoki, Yokohama, both of Japan

[73] Assignee: Nissan Motor Company, Limited, Yokohama, Japan

[21] Appl. No.: 506,214

[22] Filed: Jun. 20, 1983

[30] Foreign Application Priority Data

Jun. 21, 1982 [JP] Japan .................. 57-105483

[51] Int. Cl.³ ............... B60Q 1/00; B60Q 1/06
[52] U.S. Cl. ........................ 362/61; 362/63; 362/65; 362/66; 362/272; 362/371; 362/427; 15/250.23; 15/250.31; 15/250.34
[58] Field of Search ............ 362/61, 63, 64, 65, 362/66, 269, 272, 368, 371, 427; 318/443; 15/250.23, 250.31, 250.34

[56] References Cited

U.S. PATENT DOCUMENTS

| 3,708,822 | 1/1973 | Buchwald | 362/65 |
| 3,859,688 | 1/1975 | Fiala | 362/65 |
| 3,927,436 | 12/1975 | Inoue et al. | 15/250.17 |
| 4,152,753 | 5/1979 | Amann | 362/64 |
| 4,282,561 | 8/1981 | Yano | 362/65 |

FOREIGN PATENT DOCUMENTS

| 2816207 | 10/1979 | Fed. Rep. of Germany . |
| 5178534 | 12/1974 | Japan . |
| 5642133 | 10/1976 | Japan . |
| 1075737 | 7/1967 | United Kingdom .................. 362/65 |

OTHER PUBLICATIONS

European Search Report 83 10 6048.

Primary Examiner—Donald P. Walsh
Attorney, Agent, or Firm—Schwartz, Jeffery, Schwaab, Mack, Blumenthal & Koch

[57] ABSTRACT

A wiper-mounted retractable head lamp assembly for a vehicle, which assembly comprises a lamp, a lamp housing receiving therein the lamp to move therewith, the lamp housing being pivotably connected to the vehicle body so that is projectable from and retractable into a given space formed in the vehicle body and a head lamp wiper assembly for wiping the face of the lamp proper. Substantially all parts of the head lamp wiper assembly are mounted to the lamp housing to move therewith so that the pivoting movement of the lamp housing relative to the vehicle body is carried out without being affected by the presence of the wiper assembly.

9 Claims, 7 Drawing Figures

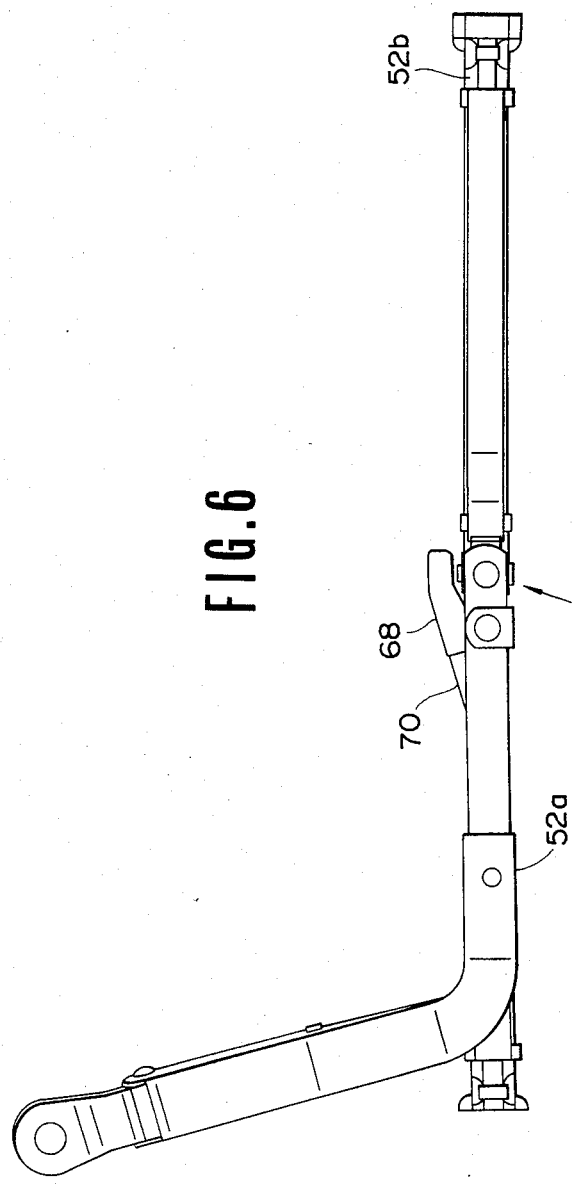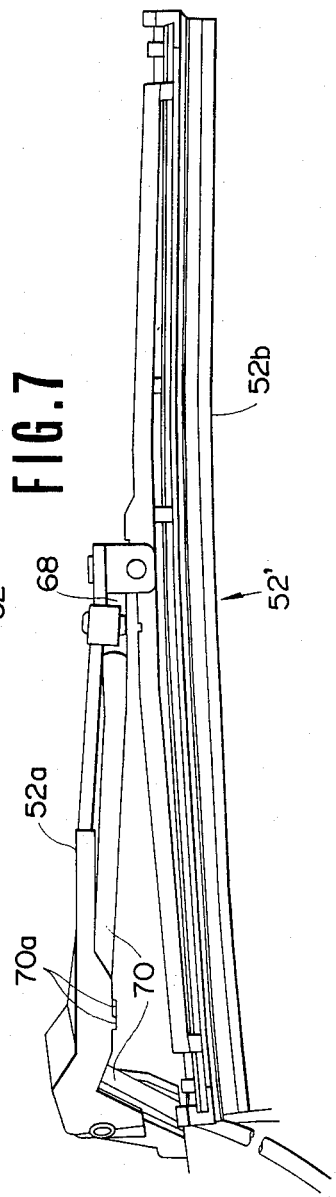

WIPER-MOUNTED RETRACTABLE HEAD LAMP ASSEMBLY

BACKGROUND OF THE INVENTION

1. Field of the Invention

The present invention relates in general to a retractable head lamp assembly of a motor vehicle, and more particularly to a so-called wiper-mounted retractable head lamp assembly wherein a wiper is mounted on the retractable head lamp to wipe same.

2. Description of the Prior Art

In the retractable type head lamp assemblies of a motor vehicle, there has been proposed a so-called wiper-mounted retractable head lamp assembly in which a wiper is mounted on the retractable head lamp to wipe same. One of them is disclosed in Japanese Utility Model Application second Publication No. Sho 56-42133. In this prior art assembly, a lamp housing which contains therein a lamp is pivotally connected to a vehicle body so that it is projectable from and retractable into a given space formed in the vehicle body. A wiper for wiping the head lamp face is connected to a reciprocably rotatable shaft which is rotatably connected to the lamp housing. The other end of the shaft is connected through a link mechanism to a reciprocably, axially movable rod which extends to a remotely located drive motor. The reciprocating axial movement of the rod induces the reciprocating wiping operation of the wiper. In addition to this, the Publication shows a measure for achieving a reliable power transmission from the reciprocably movable rod to the reciprocably rotatable shaft.

However, as is apparent to those skilled in the art, the arrangement and construction proposed by the Publication has a severe limitation in providing the lamp housing with a sufficient pivoting angle because of the presence of a rod the other end of which is connected to a drive motor which is not rotatable with the lamp housing.

SUMMARY OF THE INVENTION

Therefore, it is an object of the present invention to provide an improved wiper-mounted retractable head lamp assembly which has a sufficient pivoting angle relative to the vehicle body.

According to the present invention, there is provided a head lamp assembly for a vehicle. The assembly comprises a lamp, a lamp housing receiving therein the lamp to move therewith, the lamp housing being pivotally connected to the vehicle body so that it is projectable from and retractable into a given space formed in the vehicle body, and a head lamp wiper assembly for wiping the face of the lamp, substantially all parts of the head lamp wiper assembly being mounted to the lamp housing to move therewith so that the pivoting movement of the lamp housing relative to the vehicle body is carried out without being affected by the presence of the wiper assembly.

BRIEF DESCRIPTION OF THE DRAWINGS

Other objects and advantages of the present invention will become apparent from the following description when taken in conjunction with the accompanying drawings, in which:

FIGS. 6 and 7 are front and plan views of a washer nozzle-mounted wiper blade assembly which is used in a third embodiment of the present invention.

DETAILED DESCRIPTION OF THE INVENTION

Referring to FIGS. 1 to 4, there is shown a first embodiment of the present invention. The wiper-mounted retractable head lamp assembly of the first embodiment comprises generally two major sections, one being a retractable head lamp section 10 and the other being a wiper section 12.

Figure 1:
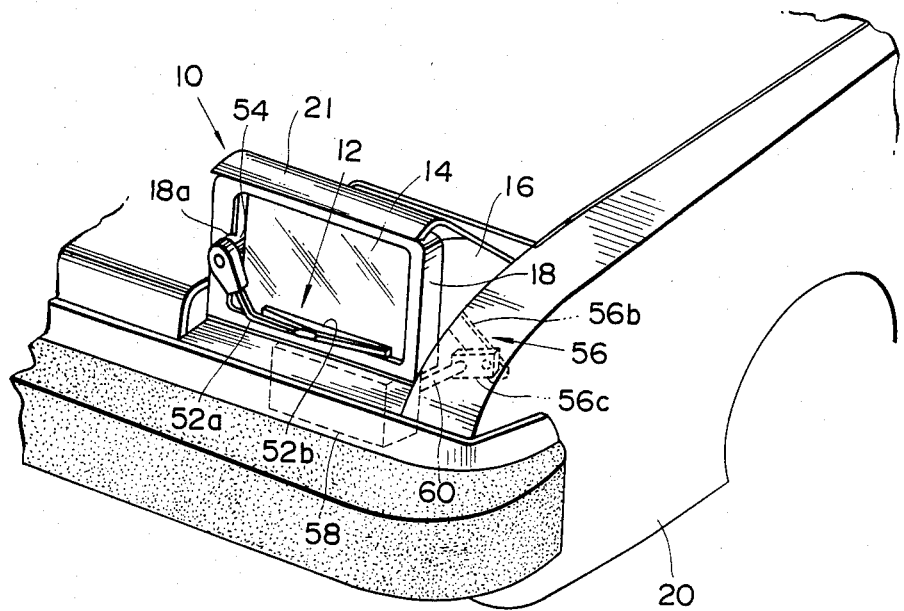
FIG. 1 is a perspective view of a front portion of a vehicle body to which a wiper-mounted retractable head lamp assembly of a first embodiment of the present invention is mounted.
Figure 2:
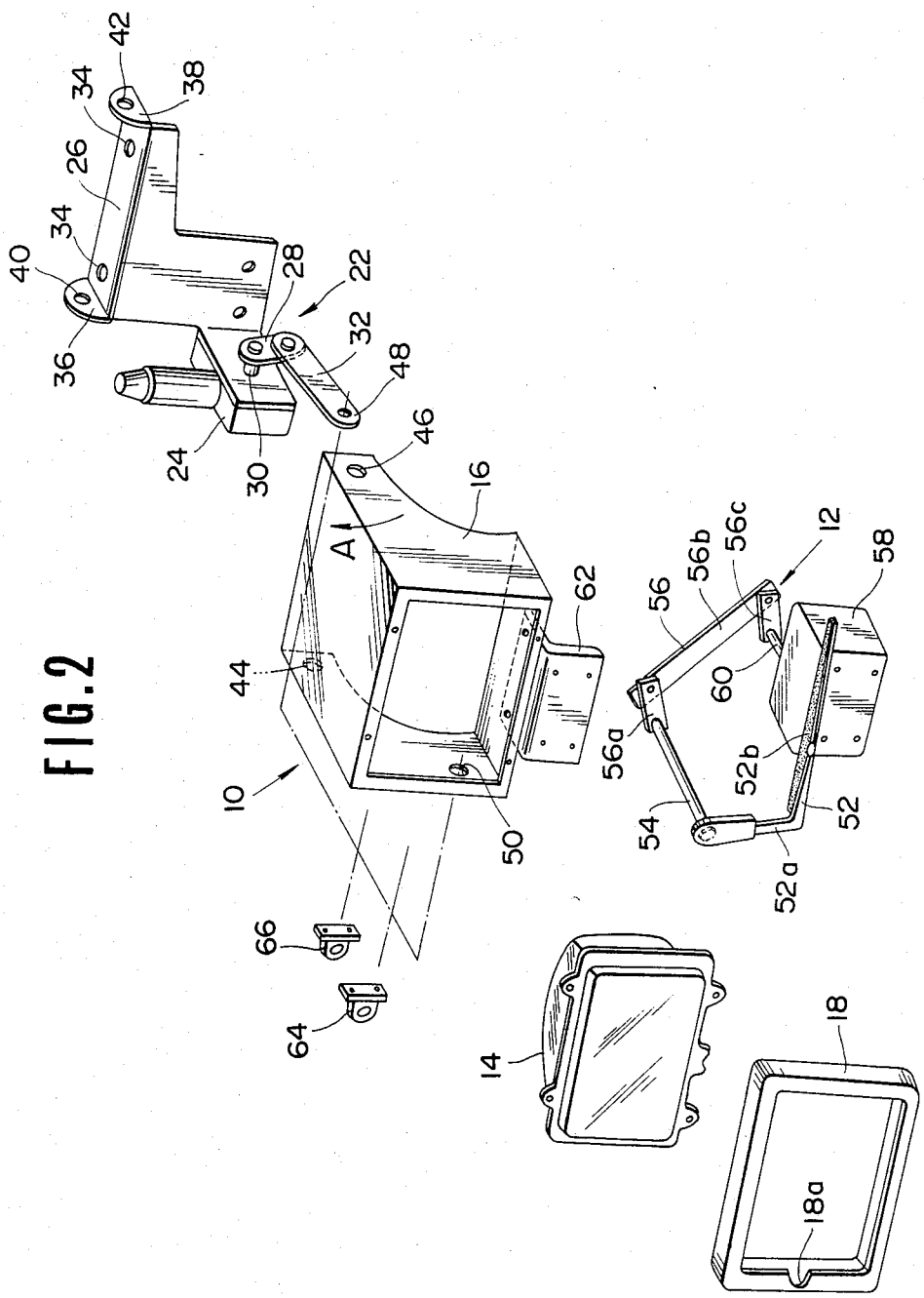
FIG. 2 is an exploded view of the wiper-mounted retractable head lamp assembly.
Figure 3:
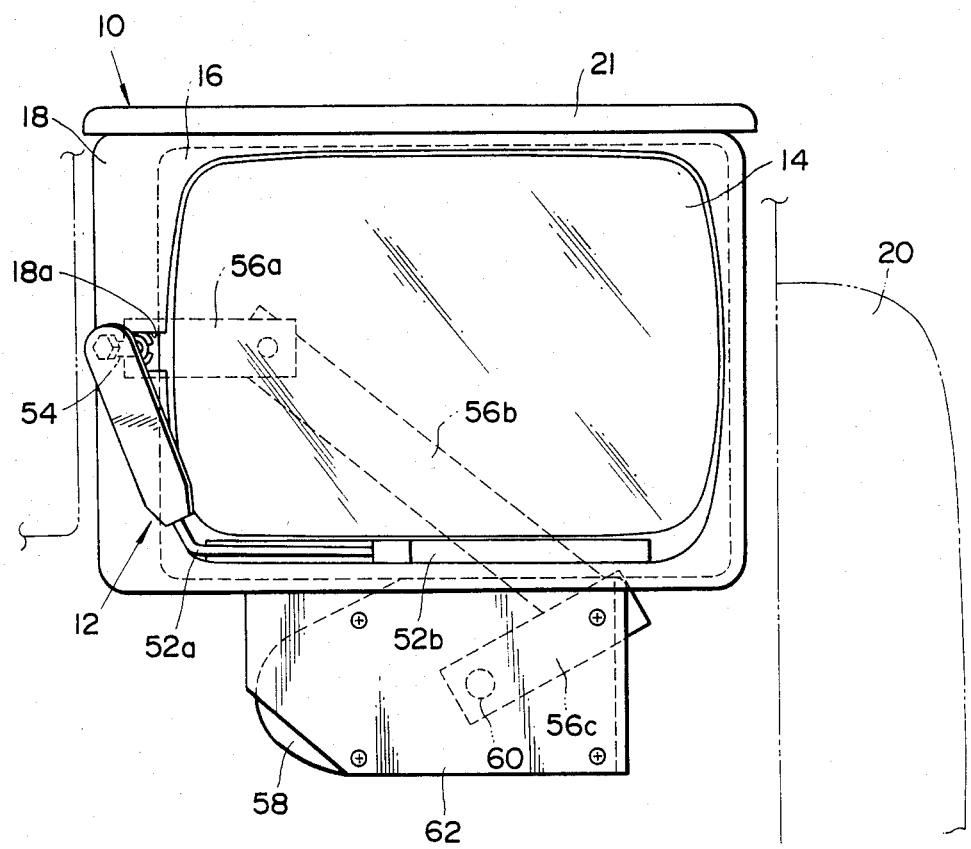
FIG. 3 is a front view of the assembly.
Figure 4:
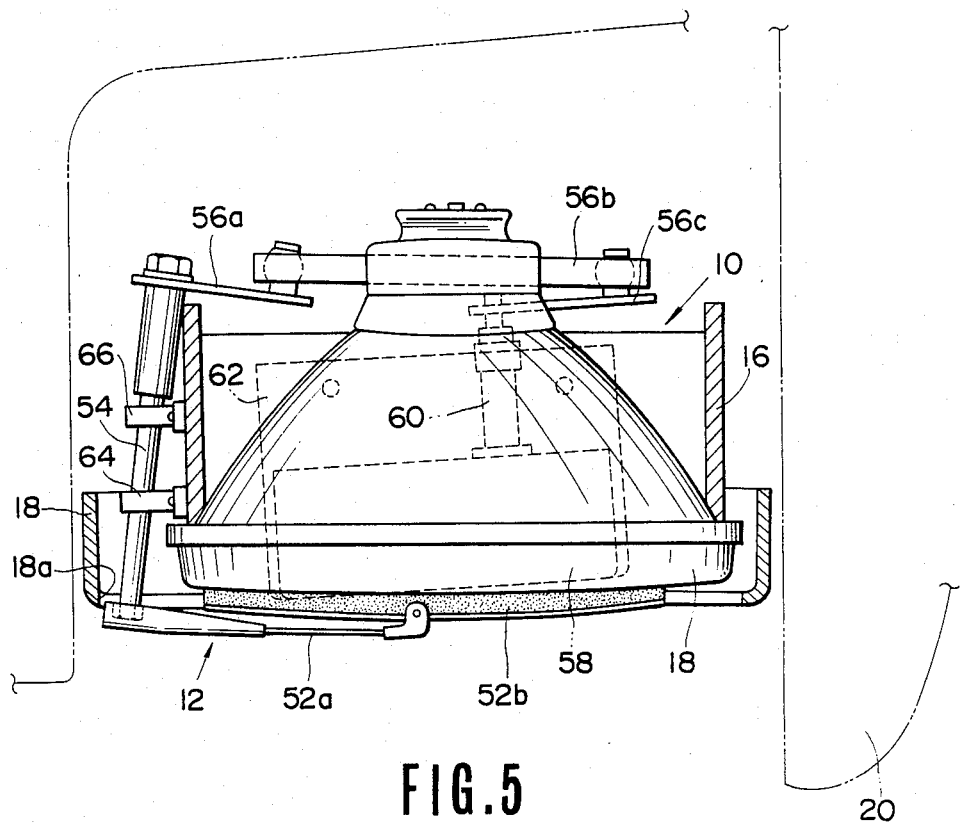
FIG. 4 is a plan view of the assembly.

The retractable head lamp section 10 comprises generally, as is best seen from FIG. 2, a lamp 14, a lamp housing 16 for holding therein the lamp 14, and a lamp cover 18 mounted on the front face of the lamp 14 to protect same. As is understood from FIG. 1, when in use, the head lamp section 10 is projected outward from a given space formed in the vehicle body 20, while, when not in use, it is retracted in the space having a lid 21 neatly covering the space. For achieving this retractable motion, a driving mechanism 22 is employed. The driving mechanism 22 comprises an electric motor 24 mounted on a bracket 26 fixed to the vehicle body 20, a first link 28 fixed to the output shaft 30 of the motor 24, and a second link 32 pivotally connected to the first link 28. The bracket 26 is secured to a given portion of the vehicle body 20 by means of bolts (not shown) which are associated with bolt holes 34 formed in the upper flat portion of the bracket 26. The upper flat portion is bent upward at its both ends to form spaced flanges 36 and 38 each having a hole 40 and 42 respectively. The lamp housing 16 is formed at its side walls with holes 44 and 46 and mounted to the bracket 26 with the holes 44 and 46 aligned with the holes 40 and 42 of the bracket 26. Although not shown in the drawings, a pivot shaft is received in the aligned holes to allow the lamp housing 16 to be pivotable about the axis of the shaft relative to the bracket 26. The leading end of the second link 32 is pivotally connected to the left wall of the lamp housing 16 so as to convert the rotating motion of the output shaft 30 of the electric motor 24 to the pivoting motion of the lamp housing 16. The pivotal connection between the second link 32 and the lamp housing 16 is made by a pivot pin (not shown) which is associated with both the hole 48 of the second link 32 and the hole 50 of the housing 16.

The wiper section 12 comprises generally, as is best seen from FIG. 2, a wiper arm assembly 52, a pivot shaft 54, a link mechanism 56 and a reversible electric motor 58. As shown, the wiper arm assembly 52 comprises a L-shaped wiper arm 52a having a base portion to which the pivot shaft 54 is bolted, and a wiper blade 52b supported on the leading end of the wiper arm 52a. The link mechanism 56 comprises a first link 56a secured to the pivot shaft 54, a second link 56b having one end pivotally connected to the first link 56a, and a third link 56c pivotally connected to the other end of the second link 56b. The third link 56c is secured to the output shaft 60 of the electric motor 58 to rotate therewith about the axis thereof. As is seen from FIG. 4, the pivot shaft 54 bridges partially over the electric motor 58 permitting the wiper assembly 52 to be located in front of the electric motor 58.

The electric motor 58 is bolted at its front side (the side facing out in FIG. 2) to a bracket 62 which is bolted to the bottom wall of the lamp housing 16. For achieving these bolt connections, the electric motor 58, the bracket 62 and the lamp housing 16 have respective bolt holes (no numerals), as shown. A pair of bearing members 64 and 66 are connected to the left wall of the lamp housing 16 to rotatably support the pivot shaft 54 of the wiper section 12. As is seen from FIGS. 2 and 4, the lamp cover 18 is formed with a cut 18a at a portion where the pivot shaft 54 is connected to the base portion of the wiper arm 52a. The wiper assembly 52, more particularly, the wiper blade 52b is biased to contact with the front face of the lamp 14, as is seen from FIG. 4. As is thus seen from the above description, the head lamp section 10 and the wiper section 12 are of a unit, which are thus movable together. The two electric motors 24 and 58 are connected to a battery through respective control switches (not shown) which are mounted within reach of the driver.

When, in operation, the head lamp assembly is not in use, it is retracted in the given space of the vehicle body 20 with the lid 21 covering the space. When lighting is required, the driver actuates associated control switch to operate the electric motor 24 to cause the lamp housing 16 to pivot in the direction of the arrow A of FIG. 2 about the axis of the holes 44 and 46 relative to the fixed bracket 26. With this operation, the head lamp assembly is raised up, lifting the lid 21 and assuming the projected position as shown in FIG. 1. The lamp 14 is then energized to light. In a case wherein cleaning of the head lamp face is not required, the wiper assembly 52 is kept assuming the lowermost position as shown in FIG. 1 in order not to affect the light distribution effect of the lamp 14.

When, under this condition, head lamp cleaning is required due to the presence of some stain on the head lamp face, the driver actuates the other associated switch to energize the other electric motor 58 which is the reversible motor. With the reversible motions of the output shaft 60 of the electric motor 58, the pivot shaft 54 and thus the wiper assembly 52 effect reciprocating upward and downward pivoting motion about the axis of the pivot shaft 54. Thus, the front face of the lamp 14 is repeatedly wiped by the wiper blade 52b.

Figure 5:
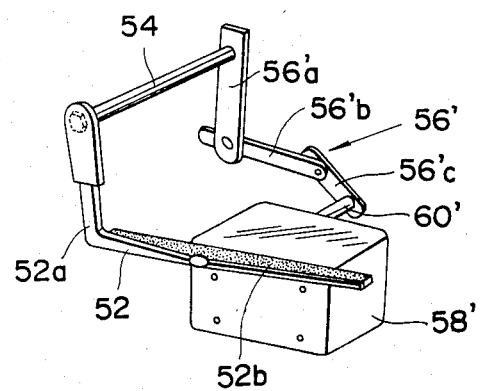
FIG. 5 is a perspective view of a wiper mechanism which is used in a second embodiment of the present invention.

Referring to FIG. 5, there is shown a wiper mechanism which is employed in a second embodiment of the present invention. The electric motor 58' in this second embodiment is a so-called one-way motor of which output shaft 60' rotates in only one direction when the motor is energized. However, in order to convert the one-way rotation of the motor output shaft 60' to the reciprocating pivoting motion of the wiper assembly 52, a modified link mechanism 56' is used in this second embodiment, which comprises a first link 56'a having one end secured to the pivot shaft 54, a second link 56'b having one end pivotally connected to the other end of the first link 56'a, and a third link 56'c having one end pivotally connected to the other end of the second link 56'b. The other end of the third link 56'c is secured to the output shaft 60' of the one-way electric motor 58'. With the arrangement of the link mechanism 56' as shown in FIG. 5, the one-way rotation of the output shaft 60' of the motor 58' is converted to the reciprocating pivoting motion of the pivot shaft 54 about its axis. Thus, similar to the first embodiment, reciprocating wiping operation of the wiper assembly 52 is achieved.

Referring to FIGS. 6 and 7, there is shown a wiper assembly 52' employed in a third embodiment of the present invention. The wiper assembly 52' in this third embodiment carries thereon a washer nozzle 68 which has a jet opening (no numeral) facing toward the face of the lamp proper 14. A flexible tube 70 is connected to the washer nozzle 68 and extends therefrom to a washer tank (not shown) arranged in the vehicle body 20. As shown in FIG. 7, the flexible tube 70 is carried on the wiper arm 52a by bent lug portions 70a formed on the wiper arm 52a. With the washer nozzle 68, it is possible to apply cleaning liquid to the face of the lamp proper 14 during or before the reciprocating wiping motion of the wiper assembly 52.

As is understood from the above description, in the invention, substantially all parts of the wiper section 12 are mounted on the head lamp section 10. Thus, the pivoting or retracting motion of the head lamp section 10 can be carried out without being affected by the presence of the wiper section 12, unlike the aforementioned prior art case.

Although the above-mentioned three embodiments are directed to an wiper assembly of the type wherein the wiper blade 52b moves upward and downward, the present invention is not limited to such a type. In fact, the invention is also applicable to another type wiper assembly wherein the wiper blade moves rightward and leftward. Furthermore, in place of the pivoting arrangement of the lamp housing 16 relative to the vehicle body 20, a vertically liftable arrangement of the same is also possible in the invention. In this case, a so-called "pantagraphic hinge mechanism" comprising four mutually pivoted links are employable for achieving the vertical movement of the lamp housing.

We claim:

1. In a motor vehicle having a body, a retractable head lamp assembly comprising:

a lamp housing having a lamp contained therein;

pivoting means for pivotally connecting said lamp housing to the body of the motor vehicle so that the lamp housing is pivotable between a retracted position and an extended position relative to a recess formed in the vehicle body; and a head lamp wiper assembly for wiping the face of said lamp, said assembly being constructionally independent of said pivoting means so that substantially all parts of said assembly are mounted to said lamp housing to move therewith, whereby the pivoting movement of said lamp housing relative to the vehicle body is freely achieved without being affected by the provision of said wiper assembly.

2. A head lamp assembly as claimed in claim 1, in which said head lamp wiper assembly comprises an electric motor fixed to the lower wall portion of said lamp housing, a wiper arm assembly positioned in the vicinity of the face of the lamp to wipe said face, and a link mechanism extending from said electric motor to said wiper arm assembly to transmit the motion produced by said electric motor to said wiper arm assembly for causing a reciprocating wiping operation of said wiper arm assembly.

3. A head lamp assembly as claimed in claim 2, in which said link mechanism is arranged to bridge partially over said electric motor.

4. A head lamp assembly as claimed in claim 3, in which said link mechanism comprises a pivot shaft which is rotatably supported on said lamp housing through a pair of bearing members.

5. A head lamp assembly as claimed in claim 4, in which said electric motor is a reversible motor, and in which said link mechanism is constructed to transmit the reversible motion of said electric motor to said wiper arm assembly.

6. A head lamp assembly as claimed in claim 4, in which said electric motor is a one-way motor of which output shaft rotates in only one direction when the motor is energized, and in which said link mechanism is constructed to convert the one-way rotation of said output shaft of the motor to a reciprocating pivoting motion of said wiper arm assembly.

7. A head lamp assembly as claimed in claim 1, further comprising a bracket fixed to said vehicle body and pivotally supporting thereon said lamp housing, an electric motor fixed to said bracket, and a link mechanism extending from said electric motor to said lamp housing to convert the rotational motion of said electric motor to the pivotal motion of said lamp housing.

8. A head lamp assembly as claimed in claim 2, further comprising a washer nozzle supported on said wiper arm assembly to move therewith, and a flexible tube extending from said washer nozzle to a washer tank arranged in the vehicle body, said washer nozzle having a jet opening facing toward the face of said lamp proper.

9. A head lamp assembly as claimed in claim 8, in which said flexible tube lies on and is carried by the wiper arm assembly.

* * * * *